US012793285B2

(12) United States Patent
Lutter et al.

(10) Patent No.: US 12,793,285 B2
(45) Date of Patent: Nov. 10, 2026

(54) CHANGING LOCKED MODES ASSOCIATED WITH DISPLAY OF COMPUTER-GENERATED CONTENT

(71) Applicant: Apple Inc., Cupertino, CA (US)

(72) Inventors: Gregory Lutter, Boulder Creek, CA (US); Bryce L. Schmidtchen, San Francisco, CA (US); Rahul Nair, Hayward, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 18/200,552

(22) Filed: May 22, 2023

(65) Prior Publication Data

US 2023/0386093 A1 Nov. 30, 2023

Related U.S. Application Data

(60) Provisional application No. 63/346,015, filed on May 26, 2022.

(51) Int. Cl.

| | |
|---|---|
| ***G06T 11/00*** | (2026.01) |
| ***G01C 21/16*** | (2006.01) |
| ***G06T 7/55*** | (2017.01) |
| ***G06T 19/00*** | (2011.01) |

(52) U.S. Cl.

CPC .............. *G06T 11/00* (2013.01); *G01C 21/16* (2013.01); *G06T 7/55* (2017.01)

(58) Field of Classification Search

CPC .......... G06T 11/00; G06T 7/55; G06T 19/006
See application file for complete search history.

(56) References Cited

U.S. PATENT DOCUMENTS

| | | | | |
|---|---|---|---|---|
| 9,298,413 | B1 * | 3/2016 | Karve | G06F 3/1446 |
| 2018/0061372 | A1 * | 3/2018 | Ano | G06F 3/1423 |
| 2019/0250733 | A1 | 8/2019 | Pelis et al. | |
| 2020/0226823 | A1 * | 7/2020 | Stachniak | G06T 19/006 |
| 2021/0097760 | A1 * | 4/2021 | Pestov | G01C 21/3837 |
| 2021/0103340 | A1 | 4/2021 | Bradski et al. | |
| 2021/0264674 | A1 * | 8/2021 | Shahrokni | G06F 3/013 |
| 2022/0139041 | A1 * | 5/2022 | Li | G06F 16/9558 345/419 |

FOREIGN PATENT DOCUMENTS

| | | | |
|---|---|---|---|
| WO | 2015168343 | A1 | 11/2015 |
| WO | 2016089638 | A1 | 6/2016 |

* cited by examiner

*Primary Examiner* — Yi Yang
(74) *Attorney, Agent, or Firm* — Fernando & Partners, LLP

(57) ABSTRACT

A method is performed at an electronic device with one or more processors, a non-transitory memory, and a display. The method includes, while displaying, on the display, the computer-generated content according to a first locked mode, determining that the electronic device changes from a first distance to a physical surface to a second distance from the physical surface. The method includes, in accordance with a determination that the second distance satisfies a locked mode change criterion, changing display of the computer-generated content from the first locked mode to a second locked mode. The method includes, in accordance with a determination that the second distance does not satisfy the locked mode change criterion, maintaining display of the computer-generated content according to the first locked mode. Examples of the locked mode change criterion include an occlusion criterion and a remoteness criterion.

20 Claims, 17 Drawing Sheets

Locked Mode Change Table 300

| Movement Types | Positional Change from DS to DF | Change locked mode? |
|---|---|---|
| First 302 | DS > DT1 | Change [Object-Locked to World-Locked] |
| | DF <= DT1 | |
| Second 304 | DS < DT1 | No Change [World-Locked] |
| | DF < DT1 | |
| Third 306 | DS < DT1 | No Change [World-Locked] |
| | DT2 > DF => DT1 | |
| Fourth 308 | DT1 < DS < DT2 | No Change [World-Locked] |
| | DT1 < DF < DT2 | |
| Fifth 310 | DT1 < DS < DT2 | Change [World-Locked to Object-Locked] |
| | DF => DT2 | |
| Sixth 312 | DS > DT2 | No Change [Object-Locked] |
| | DT1 < DF <= DT2 | |

Figure 3

CHANGING LOCKED MODES ASSOCIATED WITH DISPLAY OF COMPUTER-GENERATED CONTENT

CROSS-REFERENCE TO RELATED APPLICATIONS

This application is claims priority to U.S. Provisional Patent App. No. 63/346,015, filed on May 26, 2022, which is hereby incorporated by reference in its entirety.

TECHNICAL FIELD

The present disclosure relates to displaying computer-generated content and, in particular, to displaying the computer-generated content according to a locked mode.

BACKGROUND

In various circumstances, a device displays computer-generated content according to a particular locked mode. For example, in an extended reality (XR) environment the device may display computer-generated content anchored to a physical anchor point of a physical environment. However, maintaining the particular locked mode despite a positional change of the device can negatively affect the user experience in various ways.

SUMMARY

In accordance with some implementations, a method is performed at an electronic device with one or more processors, a non-transitory memory, and a display. The method includes, while displaying, on the display, the computer-generated content according to a first locked mode, determining that the electronic device changes from a first distance to a physical surface to a second distance from the physical surface. The method includes, in accordance with a determination that the second distance satisfies a locked mode change criterion, changing display of the computer-generated content from the first locked mode to a second locked mode. The method includes, in accordance with a determination that the second distance does not satisfy the locked mode change criterion, maintaining display of the computer-generated content according to the first locked mode.

In accordance with some implementations, an electronic device includes one or more processors, a non-transitory memory, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIG. 3 is an example of a locked mode change table that indicates how a locked mode may be changed in accordance with some implementations.

DESCRIPTION OF IMPLEMENTATIONS

Figure 1:
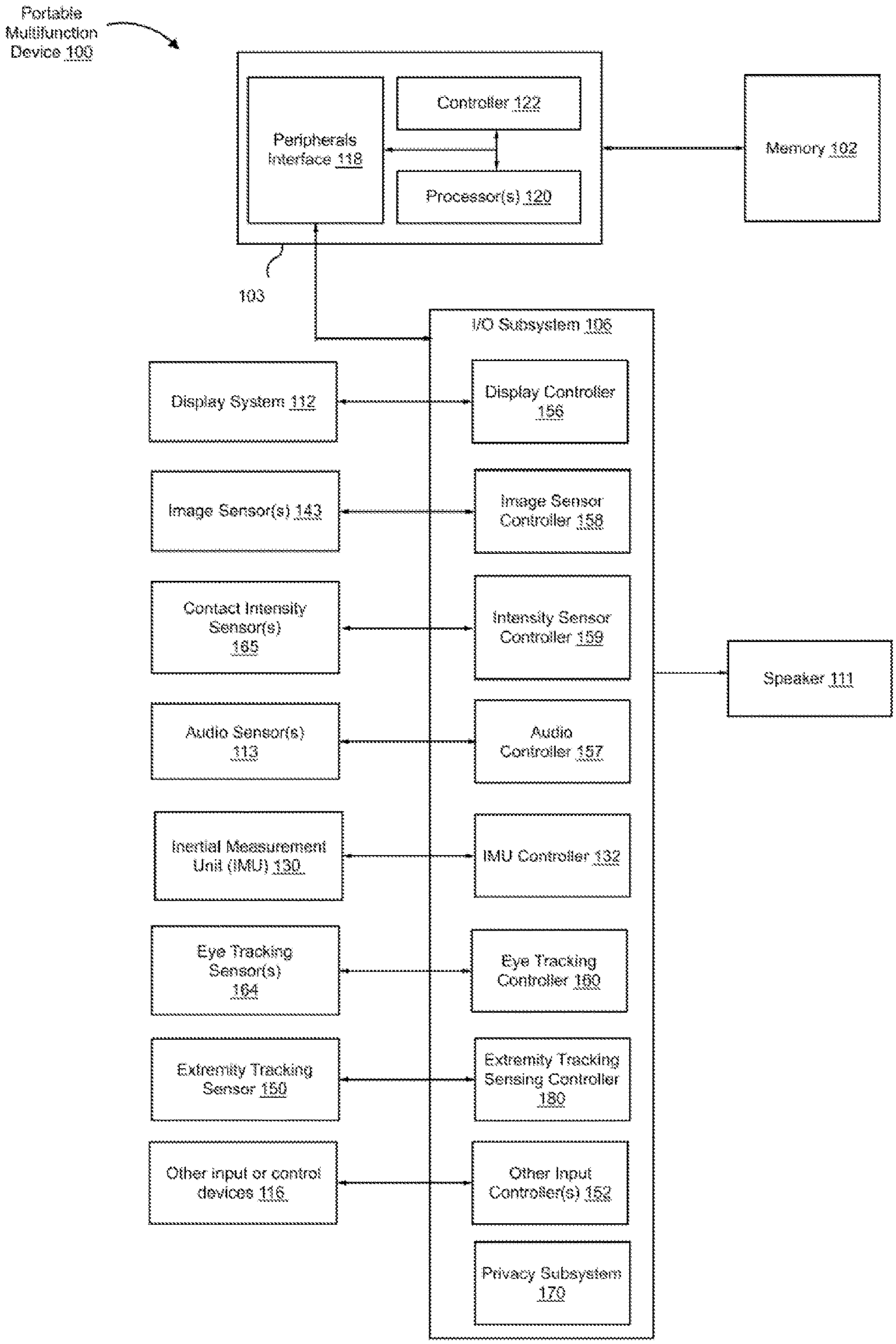
FIG. 1 is a block diagram of an example of a portable multifunction device in accordance with some implementations.

In various circumstances, a device displays computer-generated content according to a particular locked mode. For example, the device may lock the computer-generated content to a portion of a physical environment in an AR environment or a mixed reality (MR) environment. The computer-generated content may be world-locked to a physical surface of the physical environment, such as a physical wall or surface of a physical table. However, maintaining the particular locked mode despite a positional change of the device can negatively affect the user experience. For example, based on a positional change of the device, a portion of a physical environment occludes at least a portion of the computer-generated content. As another example, based on a positional change of the device, the device can no longer accurately or efficiently determine user engagement with respect to the computer-generated content.

By contrast, various implementations include methods, electronic devices, and systems of changing a locked mode associated with display of computer-generated content, based on a positional change of an electronic device. To that end, the electronic device includes a display that displays the computer-generated content according to different locked modes. For example, while the electronic device is a first distance from a physical surface, the electronic device displays the computer-generated content according to a first locked mode. The electronic device determines that the electronic device changes from the first distance to a second distance from the physical surface, such as via positional sensor data (e.g., from an IMU) or via computer vision. The electronic device further determines whether the second distance satisfies a locked mode change criterion. For example, the locked mode change criterion corresponds to an occlusion criterion that is satisfied when the second distance is less than a first threshold (e.g., the device moves too close to a physical wall). As another example, the locked mode change criterion corresponds to a remoteness criterion that is satisfied when the second distance is greater than a second threshold that is greater than the first threshold (e.g., the device moves too far away from the physical wall).

Based on determining satisfaction of the locked mode change criterion, the electronic device changes display of the computer-generated content from the first locked mode to a second locked mode. For example, based on satisfaction of the occlusion criterion, the electronic device changes display of the computer-generated content from an object-locked mode (e.g., locked to a display of the device) to world-locked to the physical surface. Changing from the object-locked mode to the world-locked mode may prevent or stop the physical surface from occluding the computer-generated content. As another example, based on satisfaction of the remoteness criterion, the electronic device changes display of the computer-generated content from a world-locked mode (e.g., world-locked to the physical surface) to an object-locked mode, enabling higher accuracy of tracking a subsequent user engagement with respect to the computer-generated content.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, paired input device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a paired input device.

In some implementations, the display system 112 corresponds to a display integrated in a head-mountable device (HMD), such as AR glasses. For example, the display system 112 includes a stereo display (e.g., stereo pair display) that provides (e.g., mimics) stereoscopic vision for eyes of a user wearing the HMD.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a paired input device, a finger, and so forth. In some implementations, the user interface is designed to work with finger-based contacts and gestures, which can be less precise than stylus-based input due to the greater area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
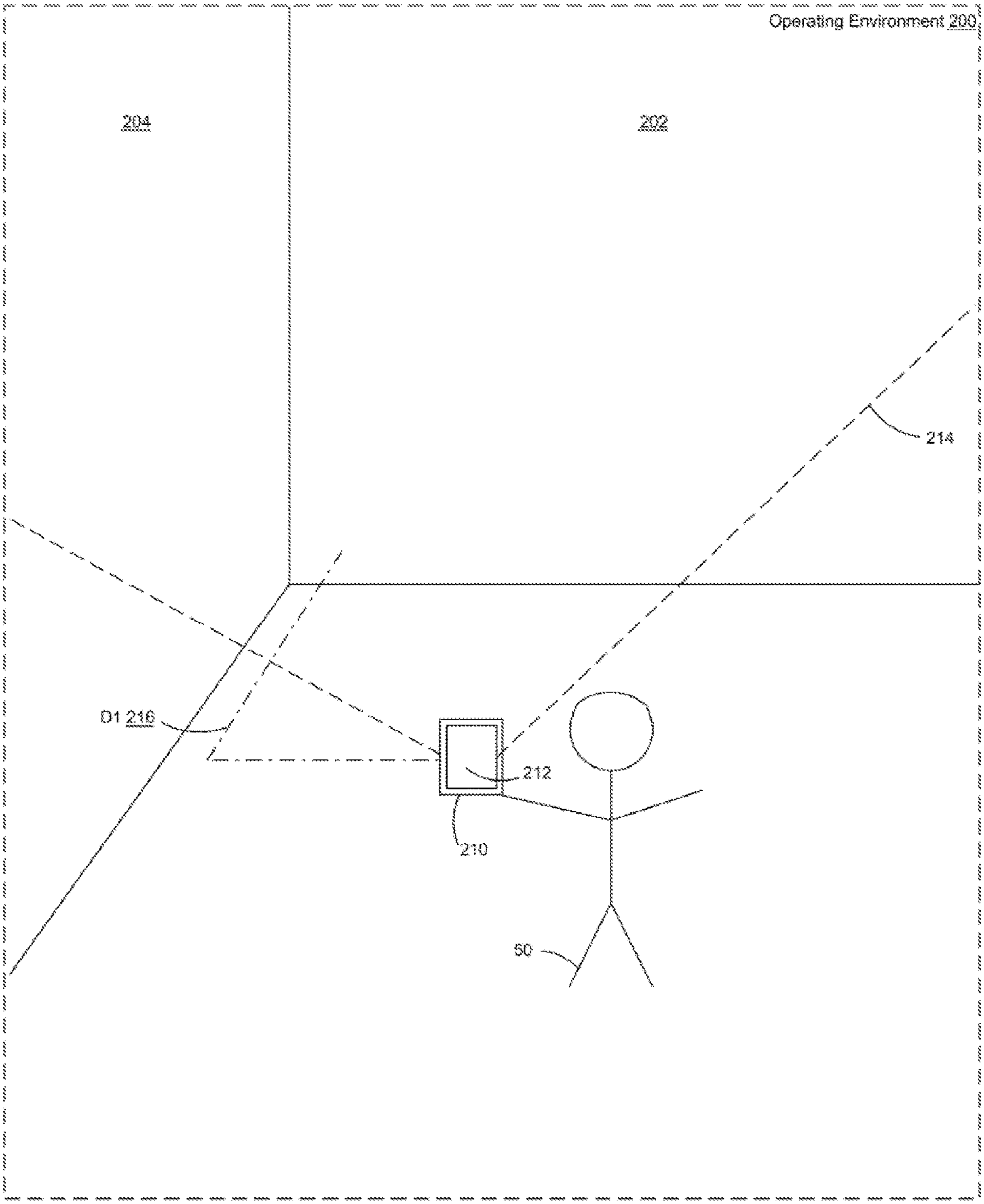
FIGS. 2A-2N are examples of changing locked modes associated with display of computer-generated content in accordance with some implementations.
Figure 2B:
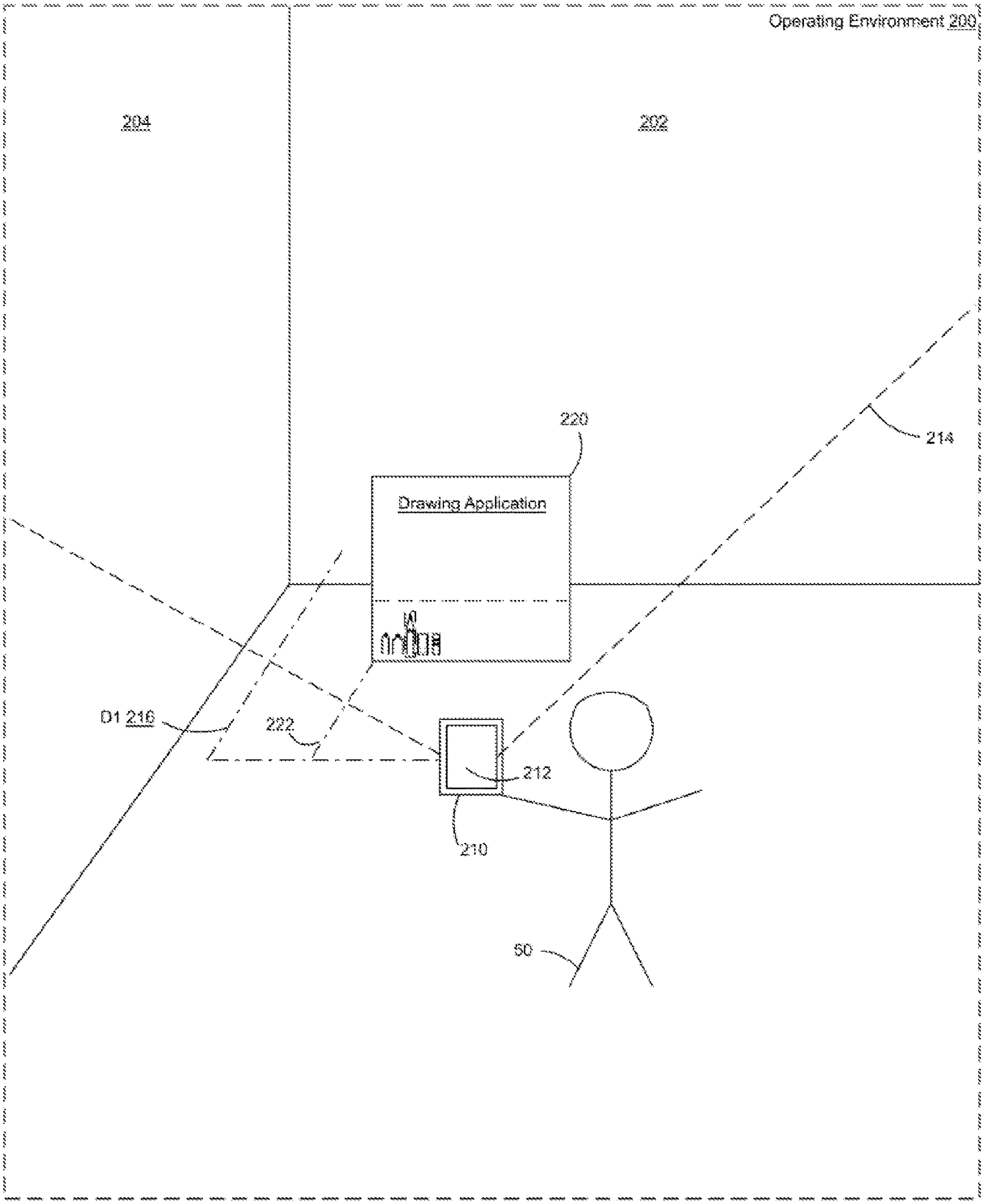
Figure 2C:
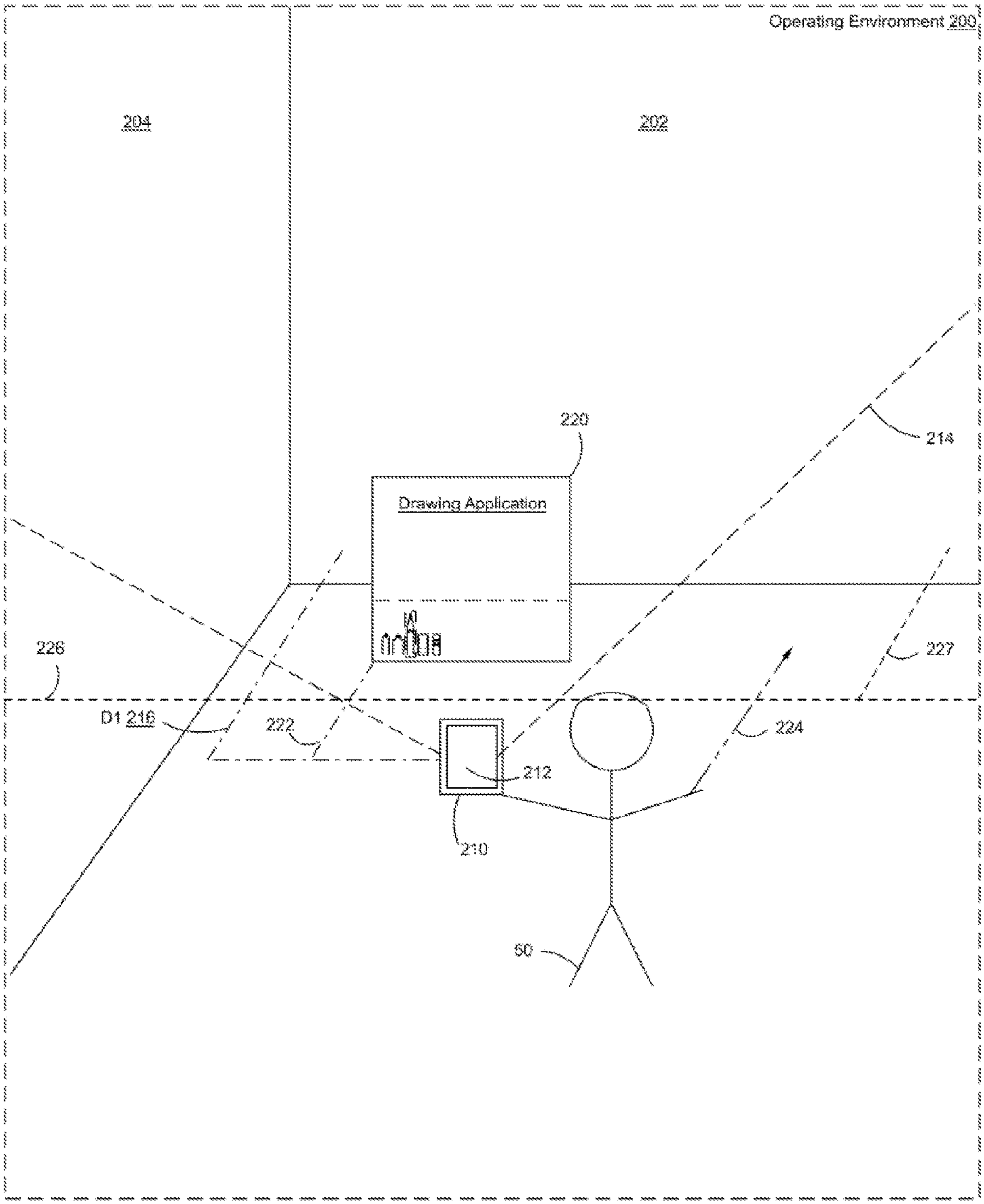
Figure 2D:
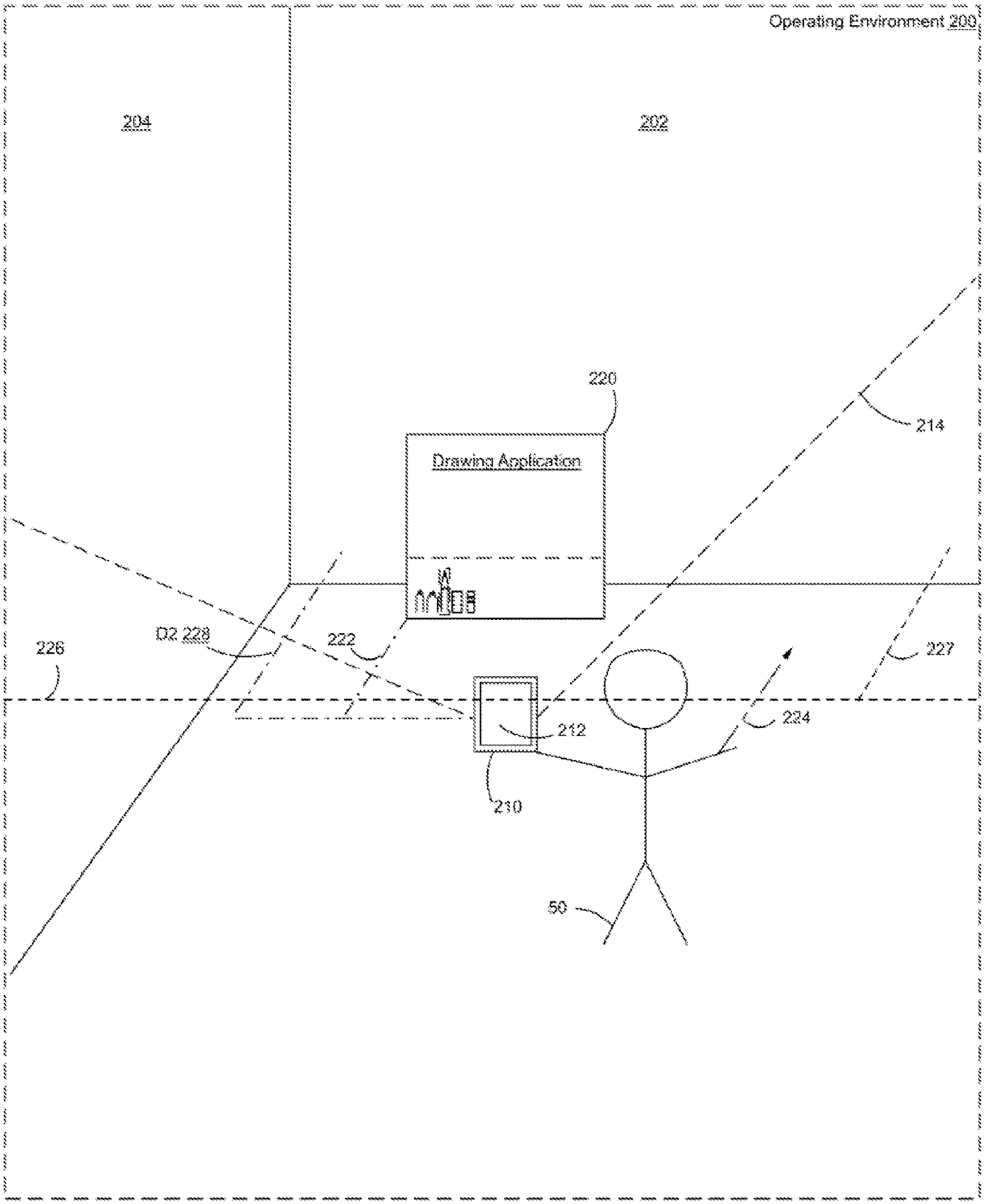
Figure 2E:
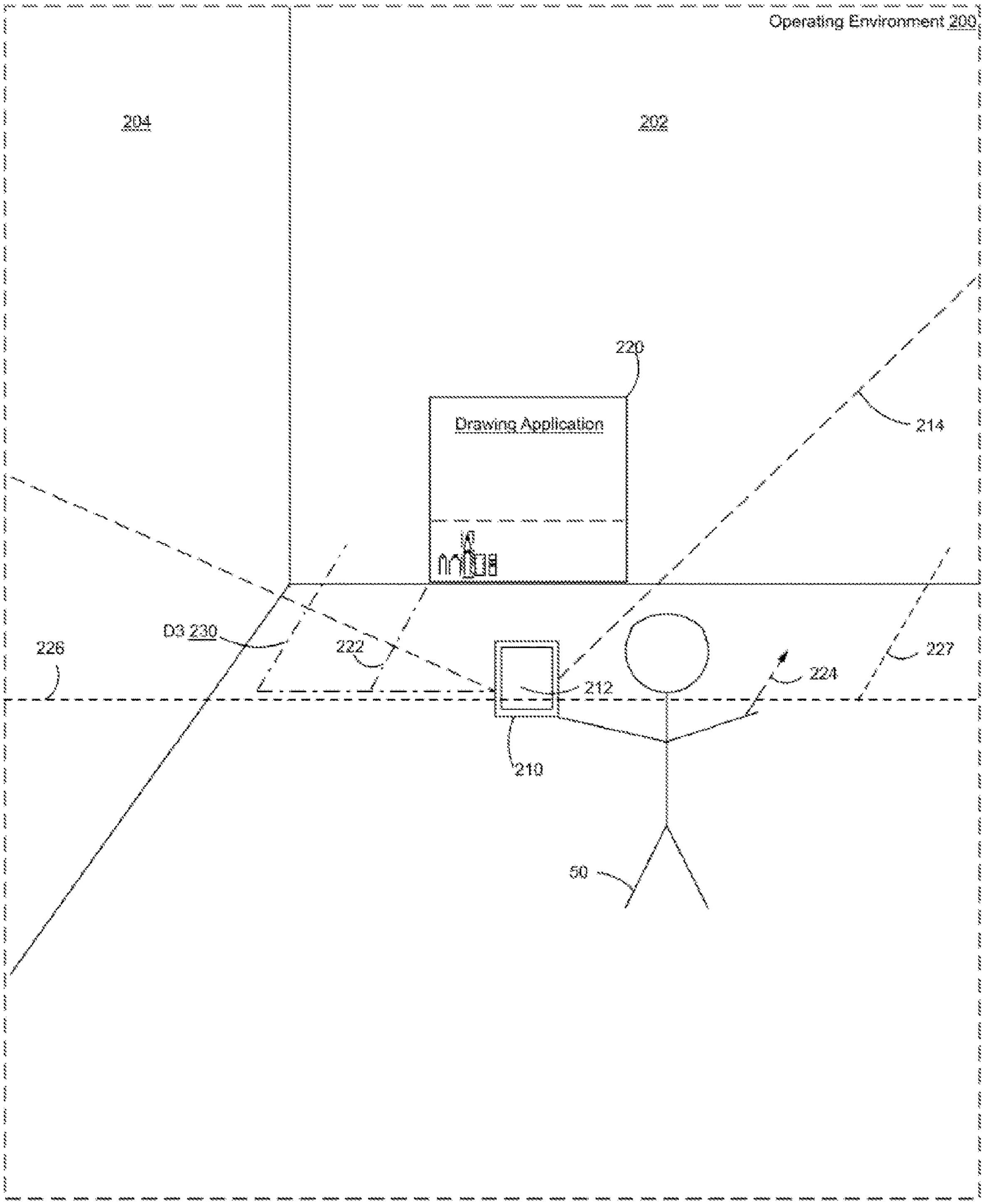
Figure 2F:
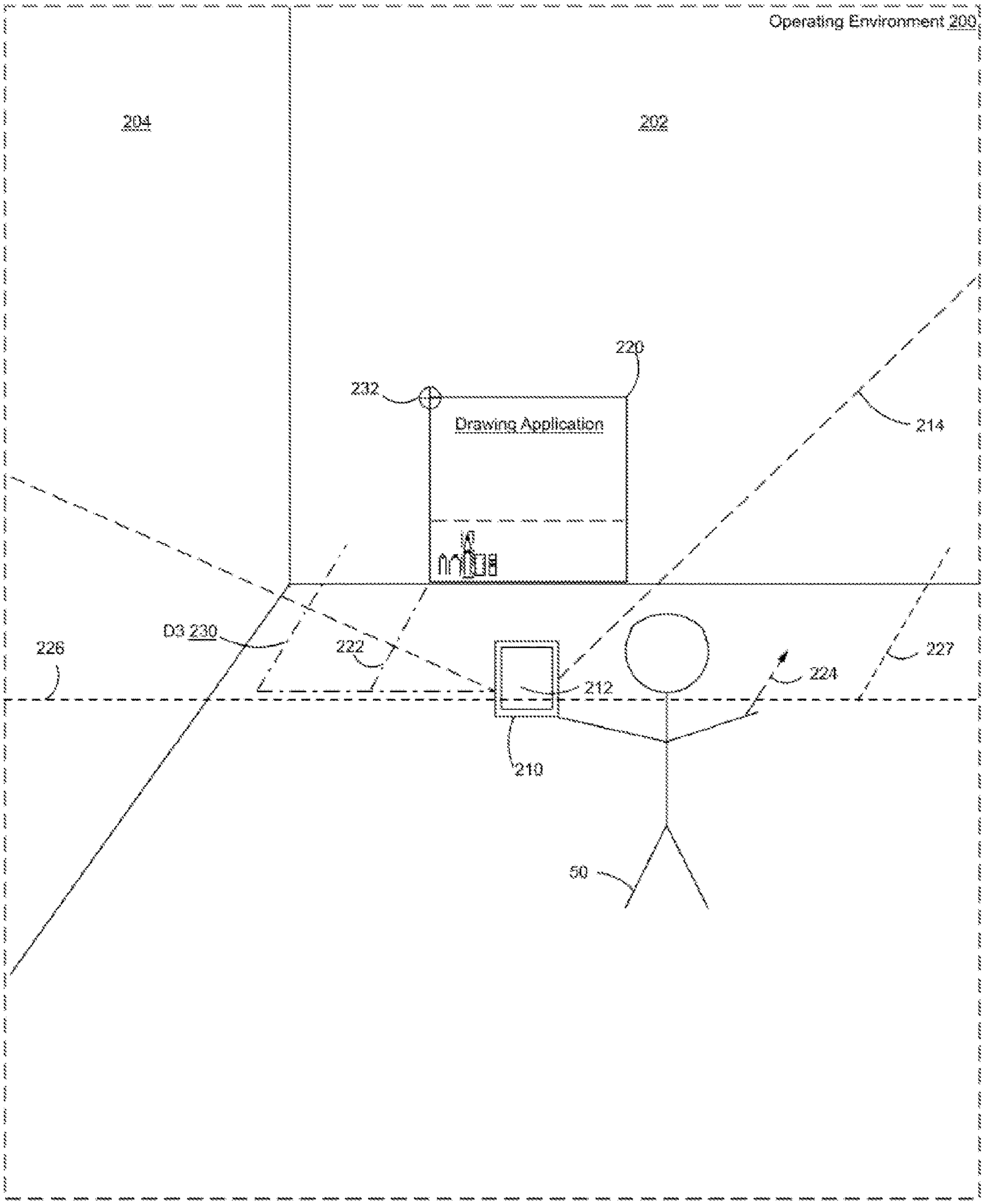
Figure 2G:
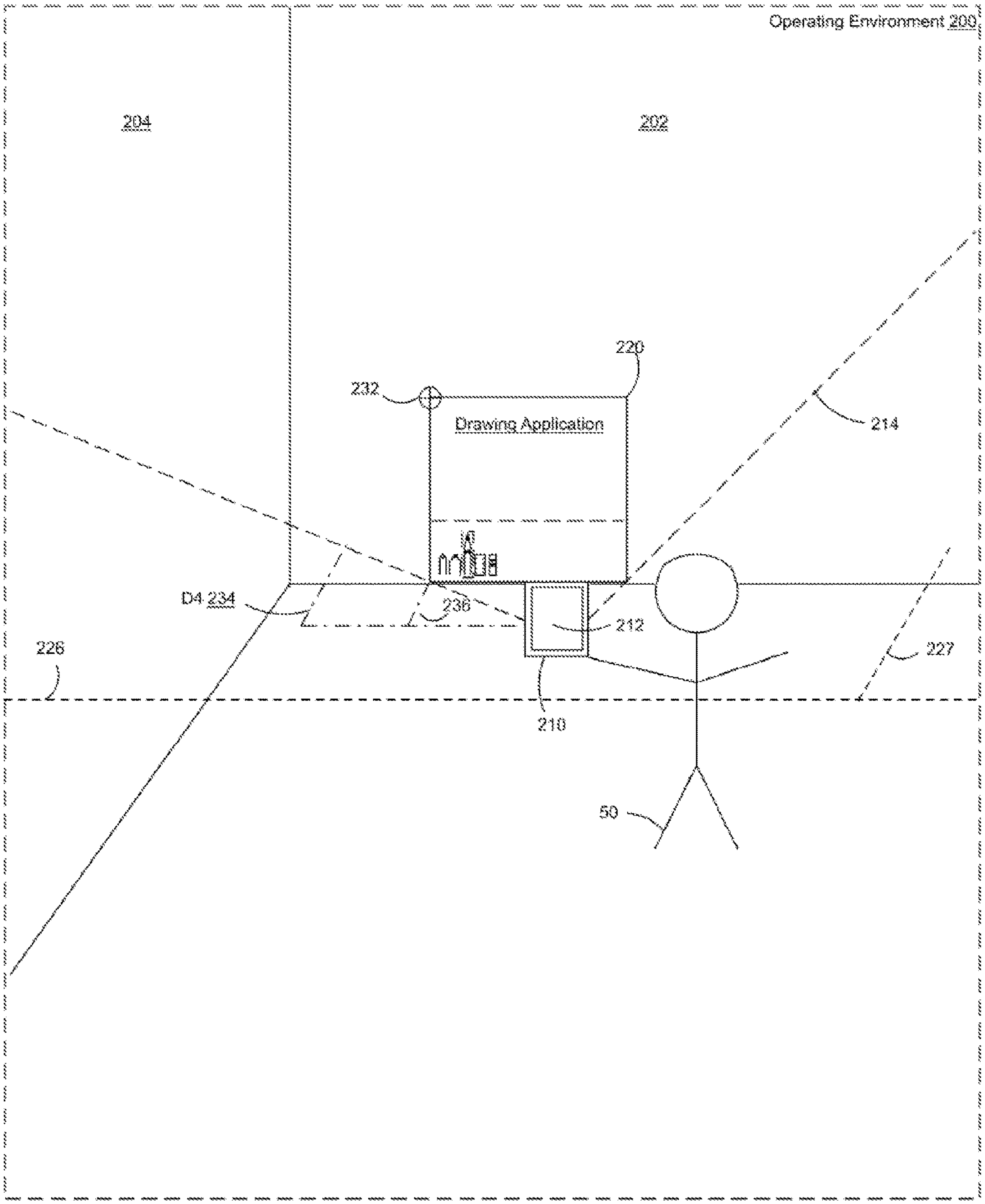
Figure 2H:
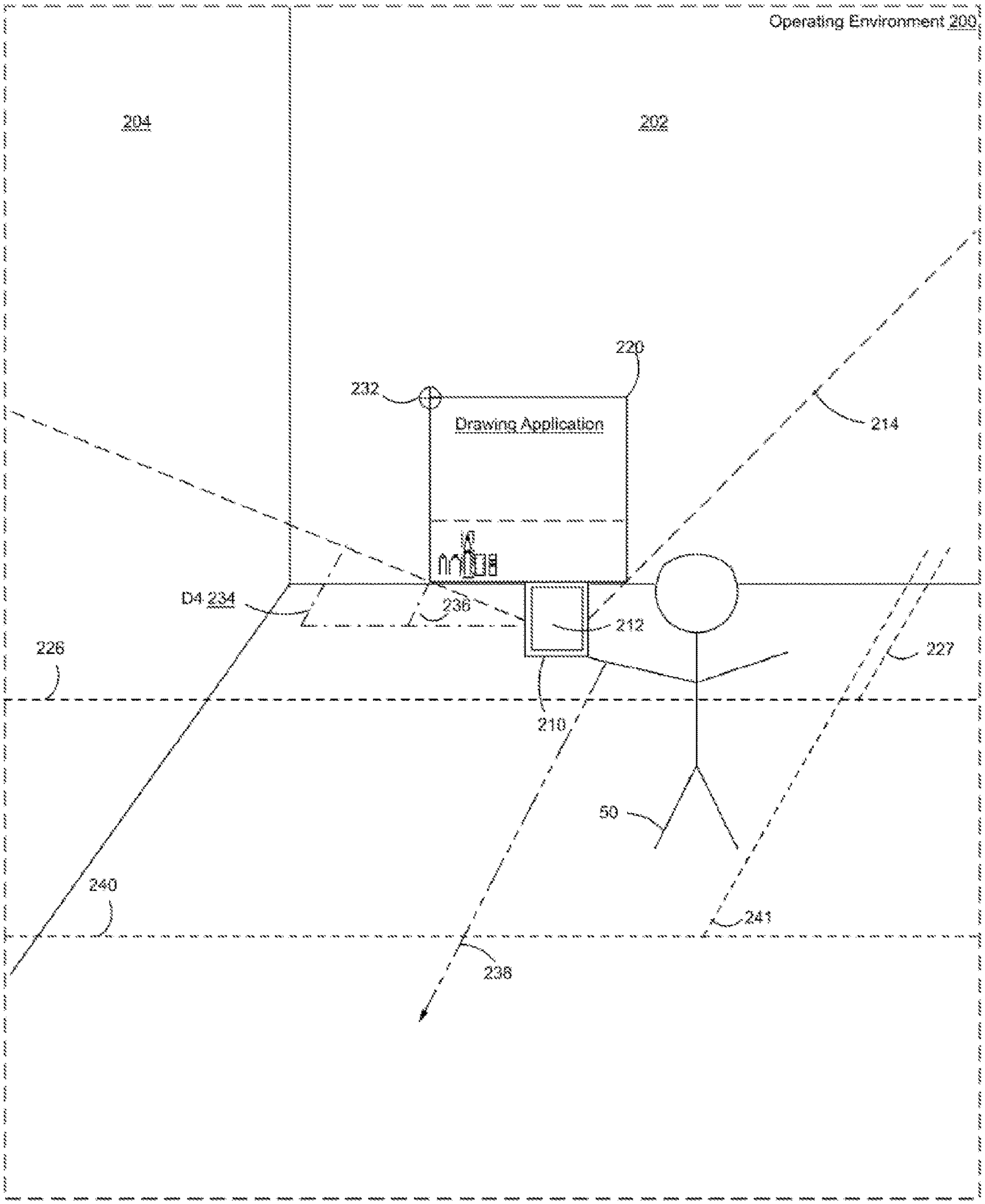
Figure 2I:
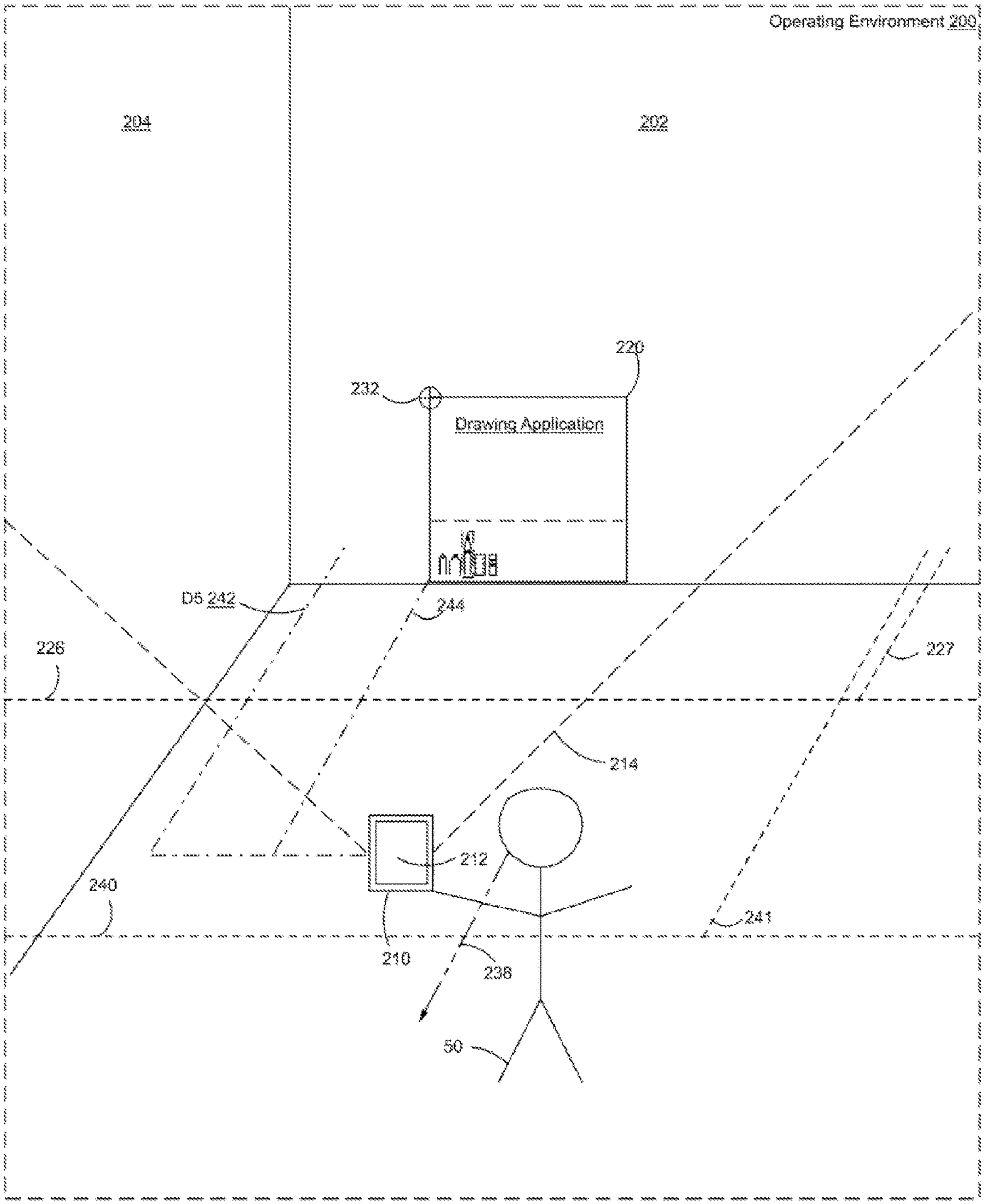
Figure 2J:
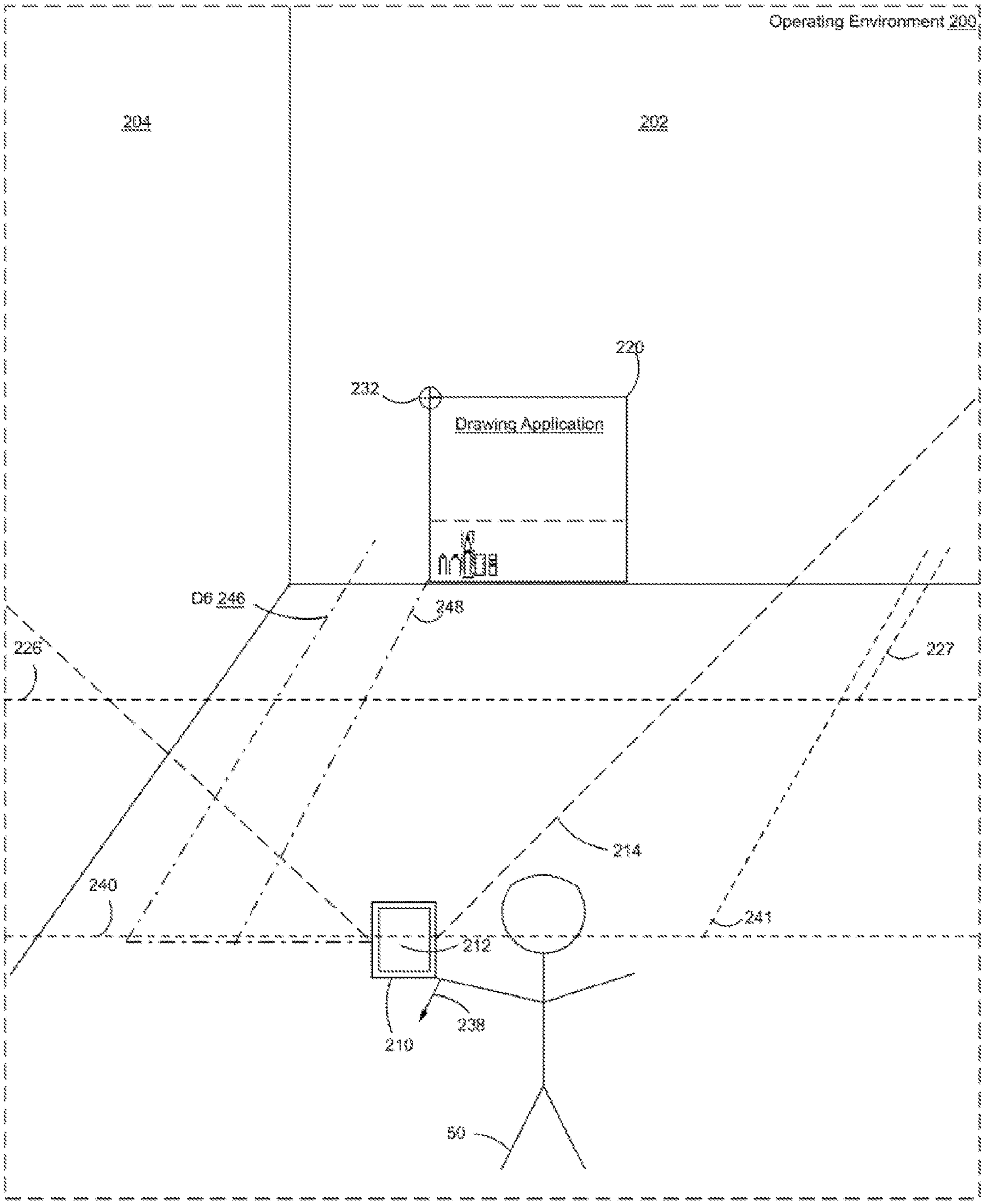
Figure 2K:
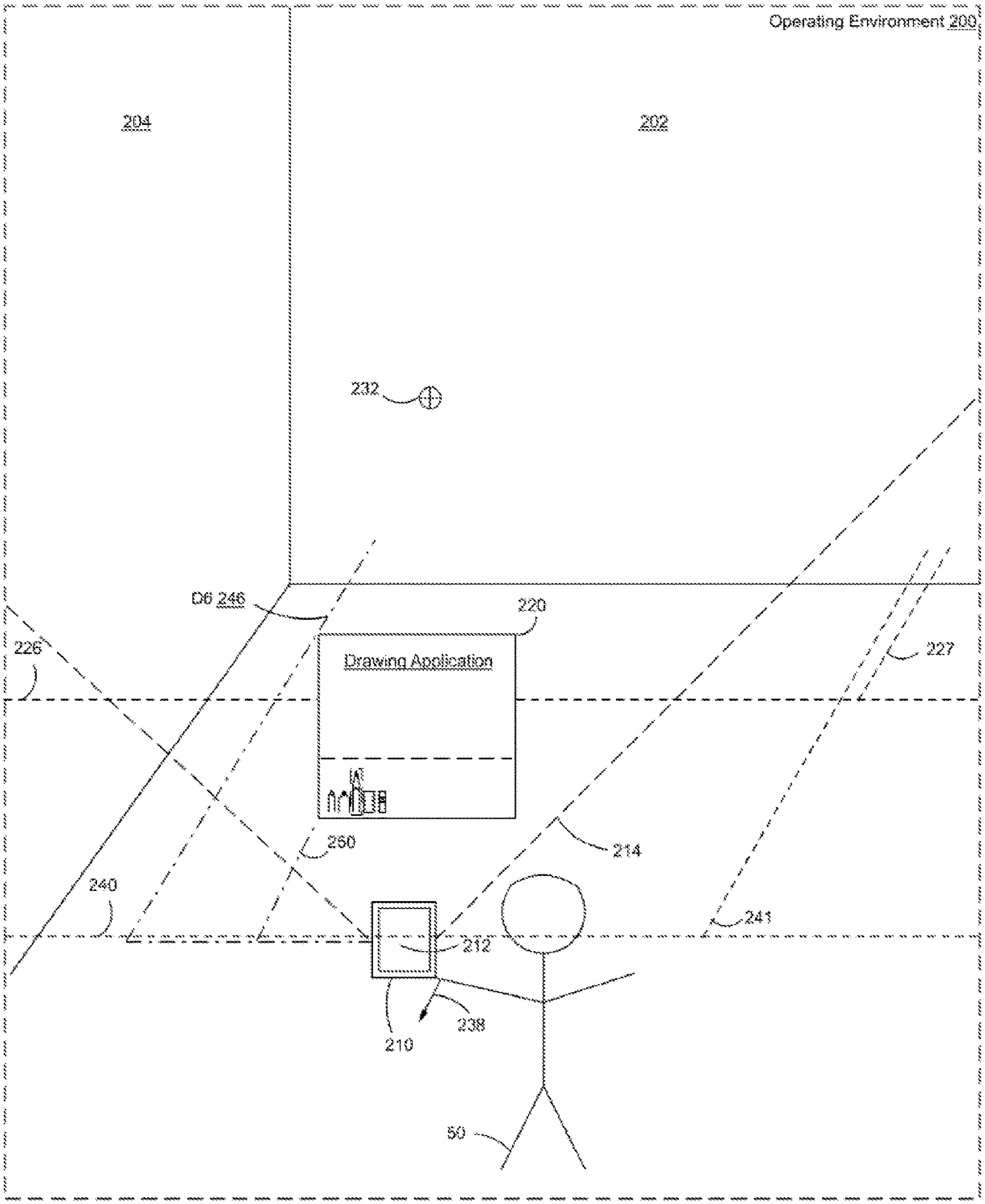
Figure 2L:
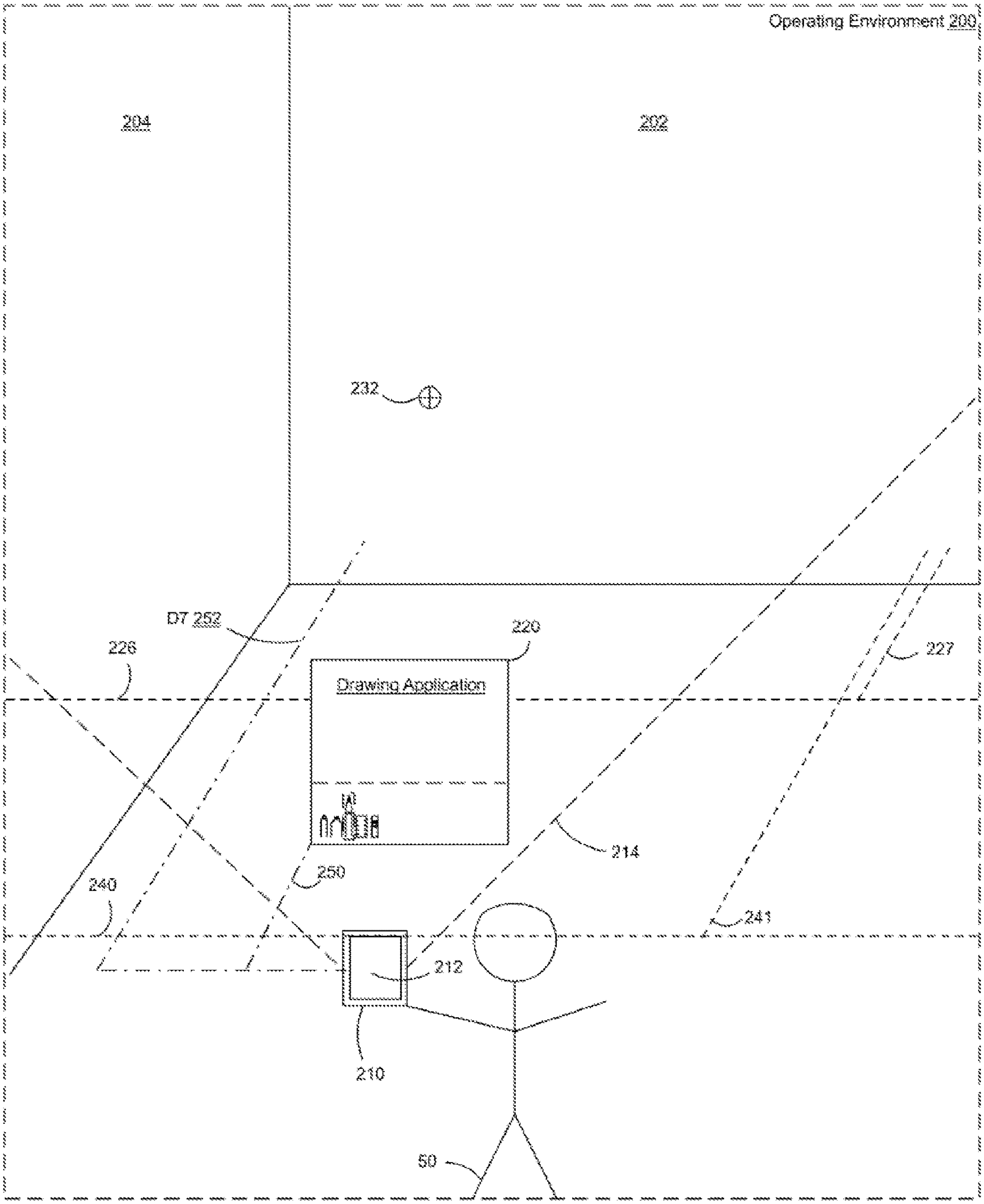
Figure 2M:
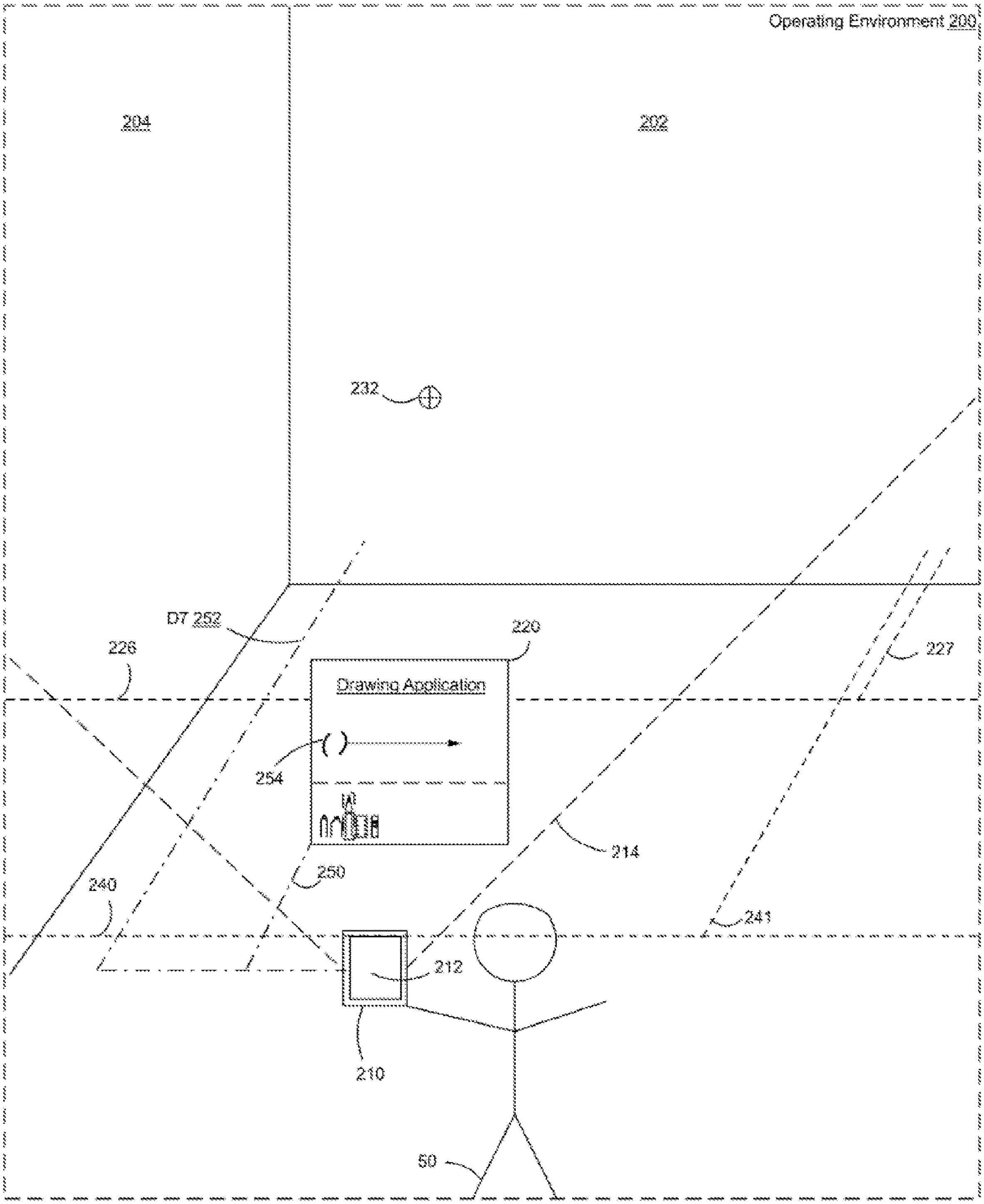
Figure 2N:
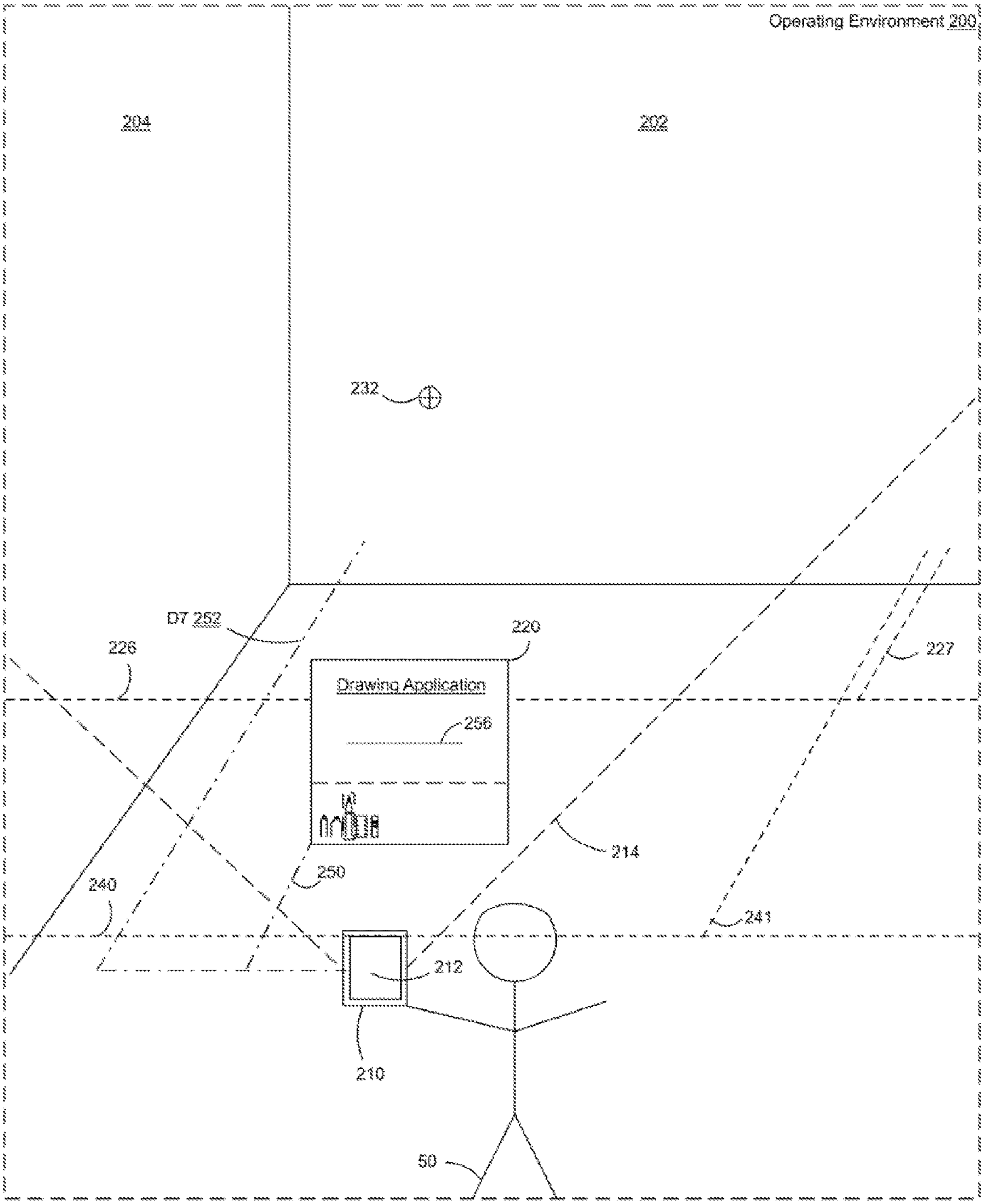

FIGS. 2A-2N are examples of changing locked modes associated with display of computer-generated content in accordance with some implementations. Referring to FIG. 2A, a user 50 holds an electronic device 210 within an operating environment 200. The operating environment 200 includes a first physical wall 202 and a second physical wall 204. The electronic device 210 is a first distance (D1) 216 from the first physical wall 202. In some implementations, the electronic device 210 corresponds to a mobile device, such as a smartphone, tablet, etc.

The electronic device 210 includes a display 212 that is associated with a viewable region 214. The viewable region 214 includes respective portions of the first physical wall 202 and the second physical wall 204. To that end, in some implementations, the electronic device 210 includes an image sensor having a field of view approximating the viewable region 214, and the image sensor captures image data of the respective portions of the first physical wall 202 and the second physical wall 204. The electronic device 210 may display the image data on the display 212, and may composite the image data with computer-generated content for display on the display 212. Accordingly, the operating environment 200 may correspond to an XR environment.

In some implementations, the electronic device 210 corresponds to a head-mountable device (HMD) that includes a stereo pair of integrated displays (e.g., built-in displays). In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) respective representations of the first physical wall 202 and the second physical wall 204.

According to various implementations disclosed herein, the electronic device 210 displays computer-generated content across different locked modes. For example, as illustrated in FIG. 2B, the electronic device 210 displays a drawing application user interface (UI) 220 according to a head-locked display mode. While in the head-locked mode, despite an orientation or a positional change of the electronic device 210, the electronic device 210 displays the drawing application UI 220 at a fixed position on the display 212. For example, the electronic device 210 displays the drawing application UI 220 at a first depth 222 from the electronic device 210, and maintains the first depth 222 despite a positional change of the electronic device 210. In other words, the first depth 222 may be characterized as a fixed depth. Similarly, the electronic device 210 may display the drawing application UI 220 at a first orientation relative to the electronic device 210, and maintains the first orientation despite an orientation change of the electronic device 210.

As illustrated in FIG. 2C, the user 50, while holding the electronic device 210, begins a first movement towards the first physical wall 202, as indicated by a first movement line 224. As further illustrated in FIG. 2C, a first threshold line 226 is a first threshold distance 227 from the first physical wall 202. As will be described below, the electronic device 210 crossing the first threshold line 226 may result in a locked mode change associated with display of the drawing application UI 220. In some implementations, the first threshold distance 227 may be equal to the first depth 222. In these implementations, the computer-generated content (e.g., the drawing application UI 220) may appear to collide with and remain fixed to the first physical wall 202, in response to movement closer than the first threshold distance 227. In other implementations, other distances may be used for the first threshold distance 227.

As illustrated in FIG. 2D, the user 50 and the electronic device 210 move closer to the first physical wall 202, from the first distance (D1) 216 to a second distance (D2) 228 from the first physical wall 202. The second distance (D2) 228 is greater than the threshold distance 227, and thus the electronic device 210 does not yet cross the first threshold line 226.

According to various implementations disclosed herein, the electronic device 210 determines whether or not the distance between a physical surface and the electronic device 210 satisfies a locked mode change criterion. Based on determining satisfaction of the locked mode change criterion, the electronic device 210 changes the locked mode associated with display of computer-generated content. In some implementations, the locked mode change criterion corresponds to an occlusion criterion that is satisfied when the distance from the physical surface is less than a first threshold. Based on determining the occlusion criterion is satisfied, the electronic device 210 changes display of the computer-generated content from a first locked mode to a second locked mode in order to prevent the physical surface occluding at least a portion of the computer-generated content. The first threshold may be based on the first threshold distance 227. For example, referring back to FIG. 2D, the electronic device 210 determines that the second distance (D2) 228 does not satisfy the occlusion criterion because the second distance (D2) 228 is not less than the first threshold distance 227.

In response to determining that the second distance (D2) 228 does not satisfy the occlusion criterion, the electronic device 210 maintains display of the drawing application UI 220 according to the head-locked mode. Because the drawing application UI 220 is displayed according to the head-locked mode, the electronic device 210 maintains the drawing application UI 220 at the first depth 222 from the electronic device 210, as illustrated in FIG. 2D.

As illustrated in FIG. 2E, the user 50 and the electronic device 210 move even closer to the first physical wall 202 and cross the first threshold line 226. Based on the positional change, the electronic device 210 is a third distance (D3) 230 from the first physical wall 202, wherein the third distance (D3) 230 is less than the second distance (D2) 228. In some implementations, the electronic device 210 determines that the third distance (D3) 230 satisfies the occlusion criterion because the third distance (D3) 230 is less than the first threshold distance 227. In response to determining that the third distance (D3) 230 satisfies the occlusion criterion, the electronic device 210 initiates a locked mode change associated with display of the drawing application UI 220.

For example, as illustrated in FIG. 2F, the locked mode change includes a change from the head-locked mode to a world-locked mode, in which the drawing application UI 220 is world-locked to a physical anchor point 232 of the first physical wall 202. The electronic device 210 may set the physical anchor point 232 based on an input from the user (e.g., gaze input or extremity input), or independent of an input from the user 50 (e.g., set the physical anchor point 232 to align with the upper left corner of the drawing application UI 220). While displaying the drawing application UI 220 according to the world-locked mode, the electronic device 210 anchors the drawing application UI 220 to the physical anchor point 232, despite a positional change of the electronic device 210.

Changing to the world-locked mode prevents or stops the first physical wall 202 from occluding at least a portion of the drawing application UI 220. The occlusion may have occurred were the drawing application UI 220 to remain in the head-locked mode, at a fixed depth from the electronic device 210. For example, as illustrated in FIG. 2G, the user 50 completes the first movement, moving the electronic device 210 closer to the first physical wall 202. Based on the positional change, the electronic device 210 is a fourth distance (D4) 234 from the first physical wall 202, wherein the fourth distance (D4) 234 is less than the third distance (D3) 230. Because the electronic device 210 anchors the drawing application UI 220 to the physical anchor point 232 in the world-locked mode, the drawing application UI 220 is changed from the first depth 222 to a smaller, second depth 236 from the electronic device 210. However, had the drawing application UI 220 remained in the head-locked mode, the drawing application UI 220 would remain at the first depth 222 from the electronic device 210, which is greater than the fourth distance (D4) 234. Accordingly, the first physical wall 202 would have occluded the drawing application UI 220, degrading the user experience. Instead, changing display of the drawing application UI 220 from the head-locked mode to world-locked mode prevents the first physical wall 202 from occluding the drawing application UI 220.

As illustrated in FIG. 2H, the user 50, while holding the electronic device 210, begins a second movement away from the first physical wall 202, as indicated by a second movement line 238. As further illustrated in FIG. 2H, a second threshold line 240 is a second threshold distance 241 from the first physical wall 202. The second threshold distance 241 is greater than the first threshold distance 227. As will be described below, the electronic device 210 crossing the second threshold line 240 may result in a locked mode change associated with display of the drawing application UI 220. In other implementations, the second threshold distance 241 may be equal to the first threshold distance 227 or may be less than the first threshold distance 227, such as when the electronic device 210 is moved closer to the first physical wall 202 (e.g., the fourth distance (D4) 234 is less than the first threshold distance 227).

As illustrated in FIG. 2I, the user 50 and the electronic device 210 move away from the first physical wall 202, but do not yet cross the second threshold line 240. Based on the positional change, the electronic device 210 is a fifth distance (D5) 242 from the first physical wall 202, wherein the fifth distance (D5) 242 is greater than the fourth distance (D4) 234.

In some implementations, the locked mode change criterion corresponds to a remoteness criterion that is satisfied when a distance between the electronic device 210 and a physical surface is greater than a second threshold. In some implementations, the physical surface is the same physical surface to which the computer-generated content (e.g., the drawing application UI 220) is anchored. However, because the fifth distance (D5) 242 is less than the second threshold distance 241, the electronic device 210 determines that the remoteness criterion is not satisfied. Accordingly, the electronic device 210 maintains the drawing application UI 220 as world-locked to the physical anchor point 232, as illustrated in FIG. 2I. Because the drawing application UI 220 remains world-locked to the physical anchor point 232, the drawing application UI 220 results in a change from the second depth 236 to a greater, third depth 244 from the electronic device 210.

As illustrated in FIG. 2J, the user 50 and the electronic device 210 move farther away from the first physical wall 202, and cross the second threshold line 240. Accordingly, the electronic device 210 changes from the fifth distance (D5) 242 to a greater, sixth distance (D6) 246 from the first physical wall 202. Moreover, the drawing application UI 220 changes from the third depth 244 to a greater, fourth depth 248. The electronic device 210 determines that the remoteness criterion is satisfied because the sixth distance (D6) 246 is greater than the second threshold distance 241 (e.g. the electronic device 210 crosses the second threshold line 240). In other words, the electronic device 210 determines that the electronic device 210 is sufficiently remote with respect to the first physical wall 202. Accordingly, as illustrated in FIG. 2K, the electronic device 210 changes the drawing application UI 220 from the world-locked mode to an object-locked mode, in which the drawing application UI 220 is changed from the fourth depth 248 to a smaller, fifth depth 250. In some implementations, the computer-generated content (e.g., the drawing application UI 220) may be displayed in an object-locked mode using a fifth depth 250 that is equal to the second threshold distance 241. In these implementations, the computer-generated content may appear to be pulled away from the physical surface in response to movement beyond the second threshold distance 241. In some implementations, the XY position of the drawing application UI 220 changes in the transition from the world-locked mode to the object-locked mode. For example, as illustrated in FIG. 2J, the drawing application UI 220 is right offset from the center of the viewable region 214, whereas in FIG. 2K the drawing application UI 220 is nearer to the center of the viewable region 214. However, in some implementations, the electronic device 210 maintains the XY position in the transition from the world-locked mode to the object-locked mode.

The object-locked mode may correspond to a display-locked mode (e.g., head-locked mode) in which the electronic device 210 maintains the drawing application UI 220 at a fixed depth and orientation relative to the display 212. For example, as illustrated in FIGS. 2K and 2L, the user 50 and the electronic device 210 move farther away from the first physical wall 202 (to a seventh distance (D7) 252), and the electronic device 210 maintains the drawing application UI 220 at the fifth depth 250 from the electronic device 210.

Changing from the world-locked mode to the object-locked mode prevents an excessive error level associated with user engagement with respect to the drawing application UI 220. For example, while the drawing application UI 220 is world-locked to the first physical wall 202, as the electronic device 210 moves away from the first physical wall 202, the distance between the electronic device 210 and the drawing application UI 220 correspondingly increases. As the distance increases, the electronic device 210 may less accurately determine user engagement with respect to the drawing application UI 220. As one example, performing eye tracking of the user 50 or extremity tracking of the user 50, in order to draw a mark within the drawing application UI 220, becomes less reliable as the distance increases. Thus, the drawn mark may not match the intent of the user

50. Changing the drawing application UI 220 to the object-locked mode (e.g., having a smaller depth from the display 212) enables a more accurate determination of user engagement. For example, as illustrated in FIG. 2M, while the drawing application UI 220 is in the object-locked mode, the electronic device 210 accurately detects a drawing input 254 (e.g., a finger of the user 50 moves rightwards in space at a position corresponding to the canvas of the drawing application UI 220). Accordingly, as illustrated in FIG. 2N, the electronic device 210 displays, on the display 212, a drawing mark 256 corresponding to the drawing input 254.

FIG. 3 is an example of a locked mode change table 300 that indicates how a locked mode may be changed in accordance with some implementations. The first column of the locked mode change table 300 indicates six movement types (302-312). Each movement type is from a starting distance (DS) from a physical surface to a finishing distance (DF) from the physical surface. For example, with reference to FIGS. 2A-2N, the physical surface corresponds to the first physical wall 202.

As indicated in the second column of the locked mode change table 300, a first movement type 302 corresponds to DS being greater than a first threshold distance (DT1), and DF being less than or equal to DT1. For example, with reference to FIGS. 2D and 2E, the electronic device 210 moves from the second distance (D2) 228, which is greater than the first threshold distance 227, to the third distance (D3) 230, which is less than the first threshold distance 227. Accordingly, as illustrated in FIG. 2F and as indicated in the third column of the locked mode change table 300, the electronic device 210 changes the drawing application UI 220 from the object-locked mode to the world-locked mode. In the world-locked mode the drawing application UI 220 is world-locked to the first physical wall 202.

As indicated in the second column of the locked mode change table 300, a second movement type 304 corresponds to each of DS and DF being less than DT1. For example, with reference to FIGS. 2F and 2G, the electronic device 210 moves from the third distance (D3) 230, which is less than the first threshold distance 227, to the fourth distance (D4) 234, which is also less than the first threshold distance 227. Accordingly, as illustrated in FIG. 2G and as indicated in the third column of the locked mode change table 300, the electronic device 210 maintains the drawing application UI 220 in the world-locked mode.

As indicated in the second column of the locked mode change table 300, a third movement type 306 corresponds to DS being less than DT1, and DF being greater than or equal to DT1 but less than a second threshold distance (DT2). In some implementations, DT2 is greater than DT1. In other implementations, DT2 is equal to DT1. In yet other implementations, DT2 is greater than DT1. For example, with reference to FIGS. 2H and 21, the electronic device 210 moves from the fourth distance (D4) 234, which is less than the first threshold distance 227, to the fifth distance (D5) 242, which is greater than the first threshold distance 227 but less than the second threshold distance 241. Accordingly, as illustrated in FIG. 2I and as indicated in the third column of the locked mode change table 300, the electronic device 210 maintains the drawing application UI 220 in the world-locked mode.

As indicated in the second column of the locked mode change table 300, a fourth movement type 308 corresponds to each of DS and DF being greater than DT1 but less than DT2. For example, with reference to FIG. 2I, the electronic device 210 moves from the fifth distance (D5) 242 to a distance from the first physical wall 202 that is greater than the fifth distance (D5) 242 but less than the second threshold distance 241 (e.g., does not cross the second threshold line 240). Accordingly, as indicated in the third column of the locked mode change table 300, the electronic device 210 maintains the drawing application UI 220 in the world-locked mode.

As indicated in the second column of the locked mode change table 300, a fifth movement type 310 corresponds to DS being greater than DT1 but less than DT2, and DF being greater than or equal to DT2. For example, with reference to FIGS. 21 and 2J, the electronic device 210 moves from the fifth distance (D5) 242, which is less than the second threshold distance 241, to the sixth distance (D6) 246, which is greater than the second threshold distance 241. Accordingly, as illustrated in FIG. 2K and as indicated in the third column of the locked mode change table 300, the electronic device 210 changes the drawing application UI 220 from the world-locked mode to the object-locked mode.

As indicated in the second column of the locked mode change table 300, a sixth movement type 312 corresponds to DS being greater than DT2, and DF being less than or equal to DT2 but greater than DT1. For example, with reference to FIG. 2L, the electronic device 210 moves from the seventh distance (D7) 252 to a distance from the first physical wall 202 that is less than the second threshold distance 241 but greater than the first threshold distance 227. Accordingly, as indicated in the third column of the locked mode change table 300, the electronic device 210 maintains the drawing application UI 220 in the object-locked mode.

Figure 4:
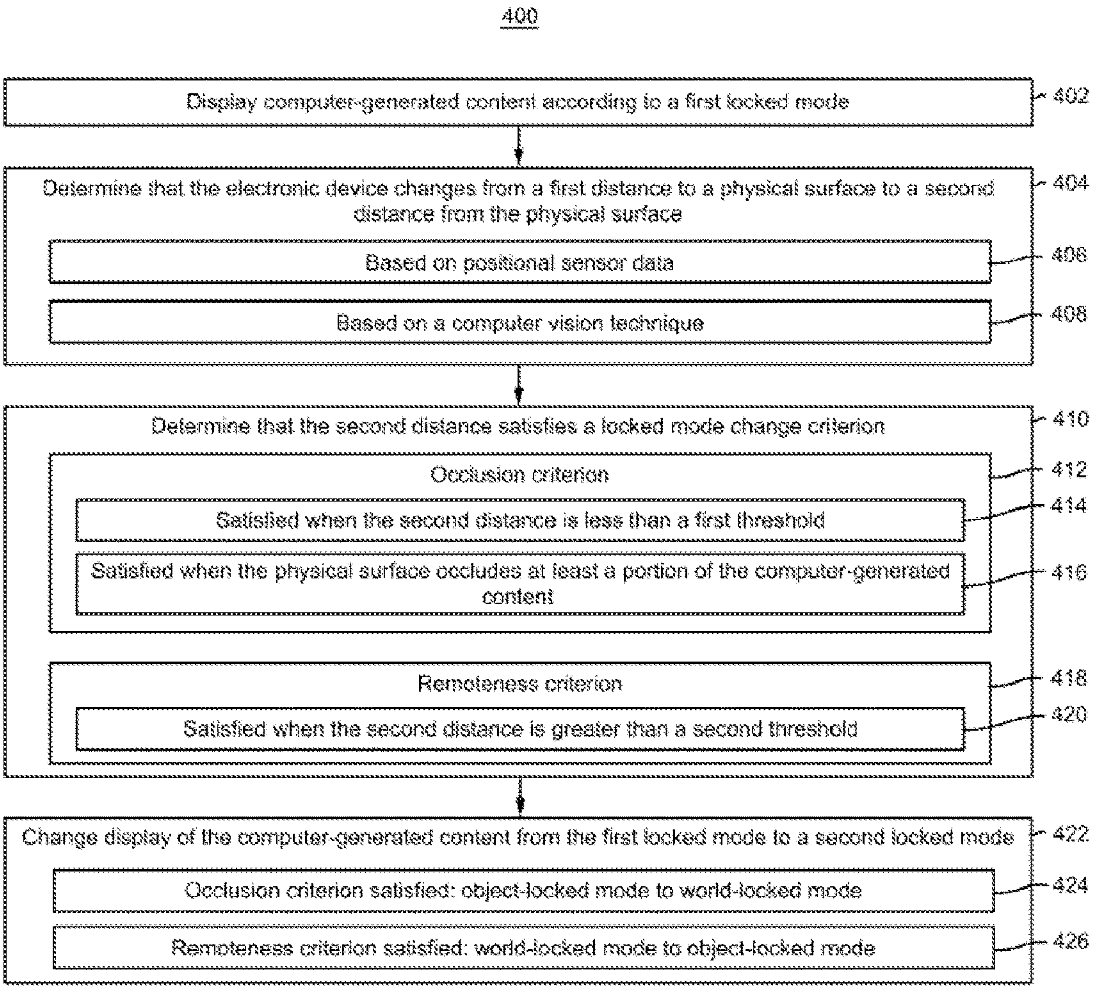
FIG. 4 is an example of a flow diagram of a method of changing a locked mode associated with display of computer-generated content in accordance with some implementations.

FIG. 4 is an example of a flow diagram of a method 400 of changing a locked mode associated with display of computer-generated content in accordance with some implementations. In various implementations, the method 400 or portions thereof are performed by an electronic device including a display (e.g., the electronic device 100 in FIG. 1, or the electronic device 210 in FIGS. 2A-2N). In various implementations, the method 400 or portions thereof are performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes displaying, on a display, computer-generated content according to a first locked mode. For example, the computer-generated content is two-dimensional (2D) content, such as a user interface (UI) or selectable affordance. As another example, the computer-generated content is three-dimensional (3D) content, such as a virtual basketball.

In some implementations, the first locked mode may correspond to an object-locked mode in which the computer-generated content is locked to an object. Examples of the object-locked mode include a body-locked mode or a display-locked mode (e.g., head-locked mode). For example, in the head-locked mode, the computer-generated content remains at a fixed depth (Z) relative to an electronic device and at a fixed XY position relative to the electronic device, despite a positional or orientation change of the electronic device. As another example, in the body-locked mode, the computer-generated content remains at a fixed depth (Z) relative to an electronic device, but the XY position relative to the electronic device changes based on a positional change of the electronic device. As yet another example, with reference to FIGS. 2B-2D, the electronic device 210 displays the drawing application UI 220 as display-locked to the display 212. Accordingly, despite a movement of the electronic device 210, the drawing application UI 220 is displayed at a fixed depth 222 (e.g., fixed Z value) and fixed orientation (e.g., fixed X value and fixed Y value) relative to the electronic device 210.

On the other hand, in the body-locked mode, based on a positional change of an electronic device, the electronic device may vary the orientation of the computer-generated content relative to the electronic device, but maintains the computer-generated content at a fixed depth (e.g., fixed z value) from the electronic device. For example, while an electronic device displays computer-generated content near the right edge of a display, the electronic device rotates rightwards. Based on the rightwards rotation, the electronic device moves the computer-generated content away from the right edge towards the center of the display. Continuing with this example, based on a subsequent translational movement (e.g., the electronic device is moved forwards towards a physical wall), the electronic device maintains the computer-generated-content at a fixed depth from the electronic device, near the center of the display (caused by the previous rightwards rotation). In some implementations, the computer-generated content may be displayed such that it persistently appears at a certain direction relative to the user or electronic device.

In some implementations, the first locked mode may correspond to a world-locked mode. In the world-locked mode, the computer-generated content is locked to a point or a portion (e.g., 2D portion or 3D portion) of a physical environment. As one example, with reference to FIGS. 2F-21, the electronic device 210 displays the drawing application UI 220 as world-locked to the physical anchor point 232 of the first physical wall 202. To that end, in some implementations, the electronic device sets the physical anchor point either based on an input from a user, or automatically (e.g., sets to the center of current viewable region of the display).

As represented by block 404, the method 400 includes, while displaying the computer-generated content according to the first locked mode, determining that the electronic device changes from a first distance to a physical surface to a second distance from the physical surface. For example, with reference to FIGS. 2A-2N, the physical surface corresponds to the first physical wall 202.

For example, as represented by block 406, determining the change from the first distance to the second distance may be based on positional sensor data from a positional sensor data. The positional sensor data may indicate a position, orientation, pose, or change thereof, of the electronic device. For example, the positional sensor corresponds to a depth sensor that generates depth sensor data. The depth sensor data includes a first distance value indicative of the first distance, and includes a second distance value indicative of the second distance. As another example, the positional sensor corresponds to an inertial measurement unit (IMU) that generates IMU data, and determining the change from the first distance to the second distance is based on the IMU data.

As another example, as represented by block 408, determining the change from the first distance to the second distance may be based on a computer vision technique. To that end, in some implementations, the electronic device performing the method 400 includes an image sensor that captures image data of the physical surface. The image data includes a first image that represents the physical surface at the first distance from the electronic device, and includes a second image that represents the physical surface at the second distance from the electronic device. Determining the change from the first distance to the second distance includes comparing the first image against the second image. For example, comparing the first image against the second image includes identifying a respective subset of pixels of the first image corresponding to the physical surface, identifying a respective subset of pixels of the second image corresponding to the physical surface, and comparing the respective subset of pixels of the first image against the respective subset of pixels of the second image. Identifying a respective subset of pixels may include performing a computer vision technique, such as a per-pixel pixel classification technique (e.g., instance segmentation or semantic segmentation), optionally with the aid of a neural network.

As another example determining the change from the first distance to the second distance may be based on a combination of the positional sensor data and the computer vision technique.

As represented by block 410, the method 400 includes determining that the second distance satisfies a locked mode change criterion. Based on determining the satisfaction of the locked mode change criterion, the method 400 includes changing the computer-generated content from the first locked mode to a second locked mode, as will be described with reference to blocks 422-426.

As represented by block 412, in some implementations, the locked mode change criterion corresponds to an occlusion criterion. The occlusion criterion is based on the physical surface occluding at least a portion of the computer-generated content, when the computer-generated content is displayed in the object-locked mode. In some implementations, in order to prevent the occlusion, the method 400 includes changing display of the computer-generated content from the object-locked mode to the world-locked mode, as will be described with reference to block 424. As represented by block 414, In some implementations, the occlusion criterion may be satisfied when the second distance from the physical surface is less than a first threshold. As one example, with reference to FIG. 2E, the electronic device 210 determines that the third distance (D3) 230 satisfies the occlusion criterion because the third distance (D3) 230 is less than the first threshold distance 227. In some implementations, the first threshold may be selected to be equal to an offset distance between the electronic device and the computer-generated content when in the first locked mode. In some implementations, as represented by block 416, determining that the second distance satisfies the occlusion criterion includes determining that the physical surface occludes at least a portion of the computer-generated content while the electronic device is the second distance from the physical surface.

As represented by block 418, in some implementations, the locked mode change criterion corresponds to a remoteness criterion. The remoteness criterion may be based on the second distance being too remote from (e.g., far away from) the physical surface to enable an accurate determination of user engagement with respect to the computer-generated content. For example, tracking the user engagement is characterized by an error level, and the remoteness criterion is based on the error level exceeding (or nearly exceeding) the error threshold. As represented by block 420, the remoteness criterion may be satisfied when the second distance is greater than a second threshold, the second threshold being greater than the first threshold. For example, with reference to FIG. 2J, the electronic device 210 determines that the remoteness criterion is satisfied because the sixth distance (D6) 246 is greater than the second threshold distance 241 (e.g. the electronic device 210 crosses the second threshold line 240). In other words, the electronic device 210 determines that the electronic device 210 is sufficiently remote with respect to the first physical wall 202. In other implementations, the second threshold is equal to the first threshold.

As represented by block 422, in accordance with a determination that the second distance satisfies a locked mode change criterion, the method 400 includes changing display of the computer-generated content from the first locked mode to a second locked mode. On the other hand, in accordance with a determination that the second distance does not satisfy the locked mode change criterion, the method 400 includes maintaining display of the computer-generated content according to the first locked mode.

For example, as represented by block 424, based on determining that the occlusion criterion is satisfied, the method 400 includes changing display of the computer-generated content from the object-locked mode to the world-locked mode. As one example, based on determining that the occlusion criterion is satisfied in FIG. 2E, the electronic device 210 world locks the drawing application UI 220 to the physical anchor point 232, as illustrated in FIGS. 2F-21. In some implementations, the physical anchor point 232 may be a point on the physical surface that the computer-generated content intersects or is closest to at the time the second distance satisfies the locked mode change criterion.

In the world-locked mode when the electronic device is the second distance from the physical surface, the computer-generated content may be displayed at a first depth from the electronic device. In some implementations, the method 400 includes determining that the electronic device changes from the second distance to a third distance from the physical surface that is less than the second distance. Moreover, the method 400 includes, in response to determining that the electronic device changes from the second distance to the third distance, reducing the depth of the computer-generated content from the first depth to a second depth from the electronic device while maintaining the computer-generated content world-locked to the physical surface. For example, in FIG. 2F the drawing application UI 220 is world-locked to the physical anchor point 232 at the first depth 222 from the electronic device 210. Based on the movement closer to the first physical wall 202 illustrated in FIG. 2G, the electronic device 210 reduces the depth from the first depth 222 to the second depth 236, in order to maintain the drawing application UI 220 as world-locked to the physical anchor point 232. Accordingly, the electronic device 210 prevents the first physical wall 202 from occluding the drawing application UI 220, despite the electronic device 210 moving closer to the first physical wall 202.

As another example, as represented by block 426, based on determining that the remoteness criterion is satisfied, the method 400 includes changing display of the computer-generated content from the world-locked mode to the object-locked mode. Examples of the object-locked mode include a body-locked mode or a display-locked mode (e.g., head-locked mode). As one example, based on determining that the remoteness criterion is satisfied in FIG. 2J, the electronic device 210 object locks the drawing application UI 220 to the display 212, as illustrated in FIGS. 2K-2N. Changing display of the computer-generated content from the world-locked mode to the object-locked mode prevents the error level (associated with tracking user engagement) from exceeding the error threshold, or reduces the error level below the error threshold. For example, the drawing operation illustrated in FIGS. 2M and 2N is associated with an error level that is below the error threshold, because the relatively small depth between the electronic device 210 and the drawing application UI 220 enables accurate engagement tracking with respect to the drawing application UI 220.

In some implementations, changing the display of the computer-generated content from the world-locked mode to the object-locked mode includes maintaining a display position associated with the world-locked mode. For example, with reference to FIG. 2J, while displaying the drawing application UI 220 in the world-locked mode, the drawing application UI 220 is displayed slightly offset to the right of the center of the viewable region 214. Based on determining that the remoteness criterion is satisfied, the electronic device 210 changes the drawing application UI 220 to the object-locked mode. Continuing with the previous example, during the transition from the world-locked mode to the object-locked mode, the electronic device 210 may maintain the drawing application UI 220 as displayed slightly offset to the right of the center of the viewable region 214, and at a fixed depth from the electronic device 210. Because the depth is fixed in the object-locked mode, translational movements of the electronic device 210 do not affect the depth. For example, as illustrated in FIGS. 2K and 2L, the fifth depth 250 is maintained despite a movement away from the first physical wall 202. Moreover, when the electronic device 210 changes the drawing application UI 220 from the world-locked mode to a body-locked mode, a rotation of the electronic device 210 affects the XY position of the drawing application UI 220, while not affecting the depth (Z) associated with the drawing application UI 220. For example, while displaying the drawing application UI 220 as slightly offset to the right of the center of the viewable region 214 in the body-locked mode, a leftwards rotation of the electronic device 210 further offsets the drawing application further to the right of the center of the viewable region 214.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at an electronic device with one or more processors, a non-transitory memory, and a display:

while displaying, on the display, computer-generated content according to a first locked mode, determining that the electronic device changes from a first distance to a physical surface to a second distance from the physical surface; and in response to determining that the electronic device changes from the first distance to the second distance:

in accordance with a determination that the physical surface would occlude at least a portion of the computer-generated content while the electronic device is at the second distance from the physical surface:

changing display of the computer-generated content from the first locked mode to a second locked mode such that the physical surface is prevented from occluding the computer-generated content;

while displaying the computer-generated content according to the second locked mode, determining that the electronic device changes from the second distance to a third distance from the physical surface that is less than the second distance; and in response to determining that the electronic device changes from the second distance to the third distance, reducing a display depth of the computer-generated content from a first depth to a second depth from the electronic device while maintaining display of the computer-generated content according to the second locked mode.

2. The method of claim 1, wherein determining that the physical surface would occlude at least a portion of the computer-generated content while the electronic device is at the second distance from the physical surface includes determining that the second distance is less than a first threshold.

3. The method of claim 2, further comprising:

while displaying, on the display, the computer-generated content according to the second locked mode, determining that the electronic device changes from the second distance to a fourth distance from the physical surface; and in accordance with a determination that the fourth distance is greater than a second threshold, changing display of the computer-generated content from the second locked mode to a third locked mode corresponding to an object-locked mode in which the computer-generated content is locked to an object.

4. The method of claim 3, wherein the second threshold is greater than or equal to the first threshold.

5. The method of claim 3, wherein the second locked mode corresponds to a world-locked mode in which the computer-generated content is world-locked to the physical surface, and wherein the third locked mode corresponds to an object-locked mode in which the computer-generated content is locked to an object.

6. The method of claim 5, wherein the object-locked mode corresponds to a display-locked mode or a body-locked mode.

7. The method of claim 3, wherein tracking user engagement with respect to the computer-generated content is characterized by an error level, and wherein changing the display of the computer-generated content from the second locked mode to the third locked mode prevents the error level from exceeding an error threshold, or reduces the error level below the error threshold.

8. The method of claim 1, wherein the first locked mode corresponds to an object-locked mode in which the computer-generated content is locked to an object, wherein the second locked mode corresponds to a world-locked mode in which the computer-generated content is world-locked to the physical surface, and wherein changing from the first locked mode to the second locked mode includes changing from the object-locked mode to the world-locked mode.

9. The method of claim 1, wherein the electronic device includes a positional sensor that generates positional sensor data, and wherein determining that the electronic device changes from the first distance to the second distance is based on the positional sensor data.

10. The method of claim 9, wherein the positional sensor corresponds to a depth sensor that generates depth sensor data included in the positional sensor data, and wherein the depth sensor data includes a first distance value indicative of the first distance and includes a second distance value indicative of the second distance.

11. The method of claim 9, wherein the positional sensor corresponds to an inertial measurement unit (IMU) that generates IMU data included in the positional sensor data, and wherein determining the change from the first distance to the second distance is based on the IMU data.

12. The method of claim 1, wherein the electronic device includes an image sensor that captures image data of the physical surface, wherein the image data includes a first image that represents the physical surface at the first distance from the electronic device, wherein the image data includes a second image that represents the physical surface at the second distance from the electronic device, and wherein determining that the electronic device changes from the first distance to the second distance includes comparing the first image against the second image.

13. The method of claim 12, wherein comparing the first image against the second image includes:

identifying a respective subset of pixels of the first image corresponding to the physical surface;

identifying a respective subset of pixels of the second image corresponding to the physical surface; and comparing the respective subset of pixels of the first image against the respective subset of pixels of the second image.

14. The method of claim 1, wherein determining whether the physical surface would occlude at least a portion of the computer-generated content comprises:

receiving, from a depth sensor of the electronic device, depth sensor data indicative of a distance from the electronic device to the physical surface; and determining, based on the depth sensor data and a known depth position of the computer-generated content, that the physical surface would occlude at least a portion of the computer-generated content while the electronic device is at the second distance from the physical surface.

15. The method of claim 1, further comprising:

in accordance with a determination that the physical surface would not occlude at least a portion of the computer-generated content while the electronic device is at the second distance from the physical surface, maintaining display of the computer-generated content according to the first locked mode.

16. An electronic device comprising:

one or more processors;

a non-transitory memory;

a display; and one or more programs, wherein the one or more programs are stored in the non-transitory memory and configured to be executed by the one or more processors, the one or more programs including instructions for:

while displaying, on the display, computer-generated content according to a first locked mode, determining that the electronic device changes from a first distance to a physical surface to a second distance from the physical surface; and in response to determining that the electronic device changes from the first distance to the second distance:

in accordance with a determination that the physical surface would occlude at least a portion of the computer-generated content while the electronic device is at the second distance from the physical surface:

changing display of the computer-generated content from the first locked mode to a second locked mode such that the physical surface is prevented from occluding the computer-generated content;

while displaying the computer-generated content according to the second locked mode, determining that the electronic device changes from the second distance to a third distance from the physical surface that is less than the second distance; and in response to determining that the electronic device changes from the second distance to the third distance, reducing a display depth of the computer-generated content from a first depth to a second depth from the electronic device while maintaining display of the computer-generated content according to the second locked mode.

17. The electronic device of claim 16, wherein the electronic device is further configured to:

while displaying, on the display, the computer-generated content according to the second locked mode, determine that the electronic device changes from the second distance to a fourth distance from the physical surface; and in accordance with a determination that the fourth distance is greater than a second threshold, change display of the computer-generated content from the second locked mode to a third locked mode corresponding to an object-locked mode in which the computer-generated content is locked to an object.

18. The electronic device of claim 16, wherein determining whether the physical surface would occlude at least a portion of the computer-generated content comprises:

receiving, from a depth sensor of the electronic device, depth sensor data indicative of a distance from the electronic device to the physical surface; and determining, based on the depth sensor data and a known depth position of the computer-generated content, that the physical surface would occlude at least a portion of the computer-generated content while the electronic device is at the second distance from the physical surface.

19. A non-transitory computer readable storage medium storing one or more programs, the one or more programs comprising instructions, which, when executed by an electronic device with one or more processors and a display, cause the electronic device to:

while displaying, on the display, computer-generated content according to a first locked mode, determine that the electronic device changes from a first distance to a physical surface to a second distance from the physical surface; and in response to determining that the electronic device changes from the first distance to the second distance:

in accordance with a determination that the physical surface would occlude at least a portion of the computer-generated content while the electronic device is at the second distance from the physical surface:

change display of the computer-generated content from the first locked mode to a second locked mode such that the physical surface is prevented from occluding the computer-generated content;

while displaying the computer-generated content according to the second locked mode, determine that the electronic device changes from the second distance to a third distance from the physical surface that is less than the second distance; and in response to determining that the electronic device changes from the second distance to the third distance, reduce a display depth of the computer-generated content from a first depth to a second depth from the electronic device while maintaining display of the computer-generated content according to the second locked mode.

20. The non-transitory computer readable medium of claim 19, wherein the electronic device is further caused to:

while displaying, on the display, the computer-generated content according to the second locked mode, determine that the electronic device changes from the second distance to a fourth distance from the physical surface; and in accordance with a determination that the fourth distance is greater than a second threshold, change display of the computer-generated content from the second locked mode to a third locked mode corresponding to an object-locked mode in which the computer-generated content is locked to an object.

* * * * *